(12) United States Patent
Therisod

(10) Patent No.: US 7,066,661 B2
(45) Date of Patent: Jun. 27, 2006

(54) SMALL FOOTPRINT OPTICAL FIBER TRANSCEIVER

(76) Inventor: Stefano Therisod, 555 E. Washington Ave. #1416, Sunnyvale, CA (US) 94086

( * ) Notice: Subject to any disclaimer, the term of this patent is extended or adjusted under 35 U.S.C. 154(b) by 124 days.

(21) Appl. No.: 10/813,938

(22) Filed: Mar. 30, 2004

(65) Prior Publication Data

US 2005/0220427 A1    Oct. 6, 2005

(51) Int. Cl.
*G02B 6/36* (2006.01)
*G02B 6/12* (2006.01)
*G02B 6/42* (2006.01)

(52) U.S. Cl. .............................. 385/92; 385/14; 385/27

(58) Field of Classification Search .................. 385/14, 385/92, 27
See application file for complete search history.

(56) References Cited

U.S. PATENT DOCUMENTS 6,817,782 B1 *  11/2004  Togami et al. ................ 385/92

* cited by examiner

*Primary Examiner*—Frank G. Font
*Assistant Examiner*—Michael P. Mooney

(57) ABSTRACT

An optical transceiver includes a main body that serves as the heat sink for the optical transceiver. A wafer-level package is attached to a first face of the main body. The wafer-level package contains at least one optoelectronic device such as a light-emitting device or a light detector. An alignment element is attached to the wafer-level package for aligning an optical fiber to the optoelectronic device. A fiber receptacle is attached to the main body for holding the optical fiber securely. One or more auxiliary components can be attached to a second face of the main body. An optional cover can be attached to the main body to cover and protect the auxiliary components. A flexible circuit is made of a pliable material and is attached to the main body. The flexible circuit electrically couples the auxiliary components and the wafer-level package.

20 Claims, 5 Drawing Sheets

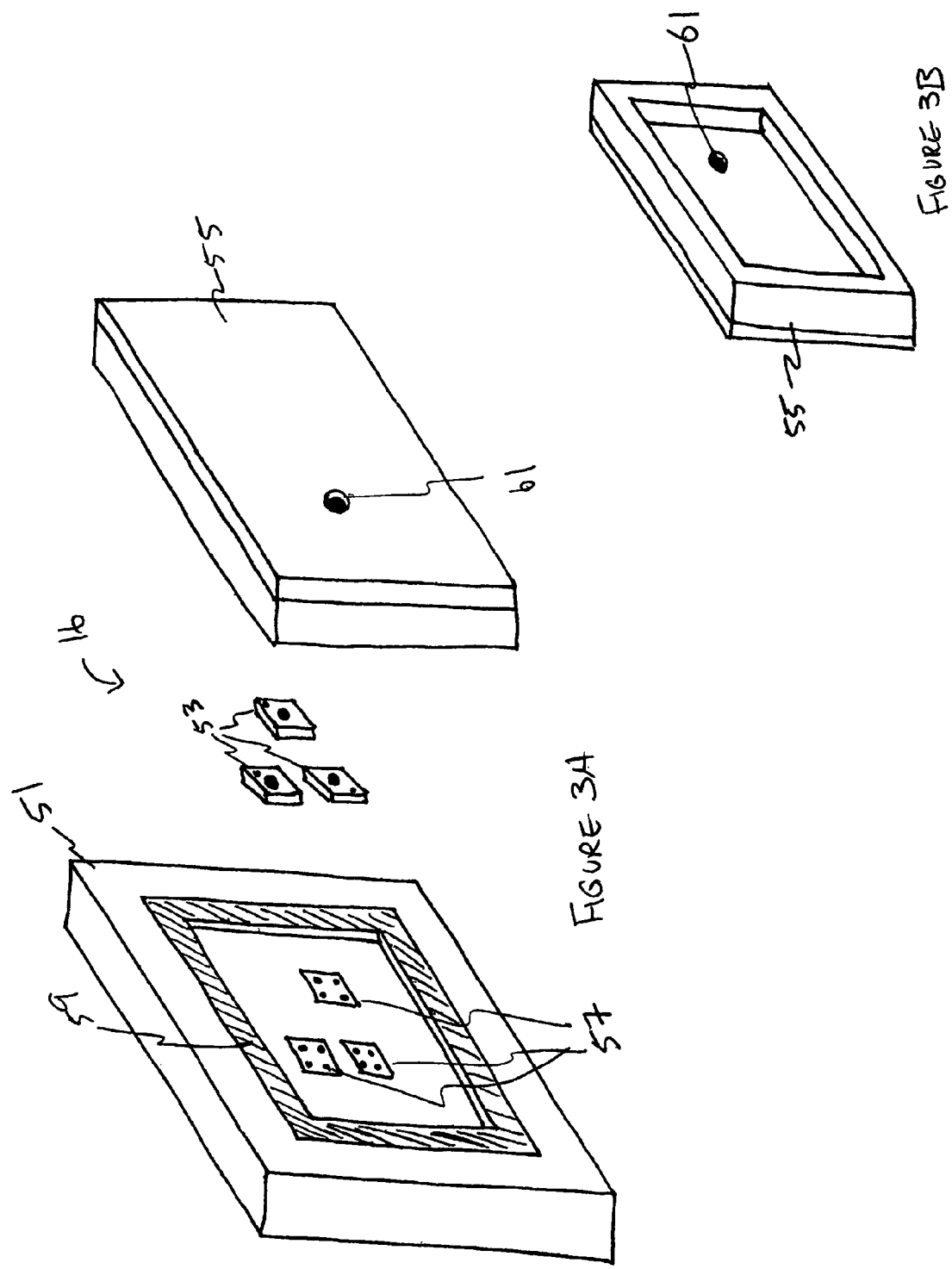

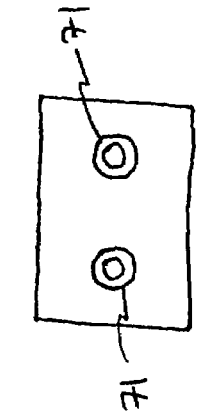
FIGURE 4B
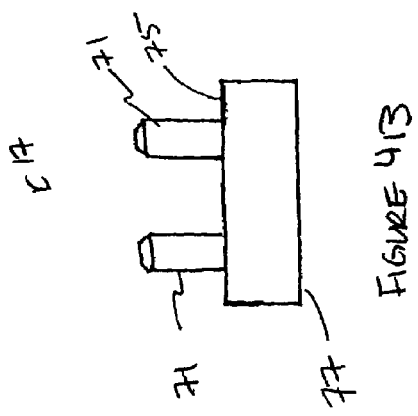
FIGURE 4D
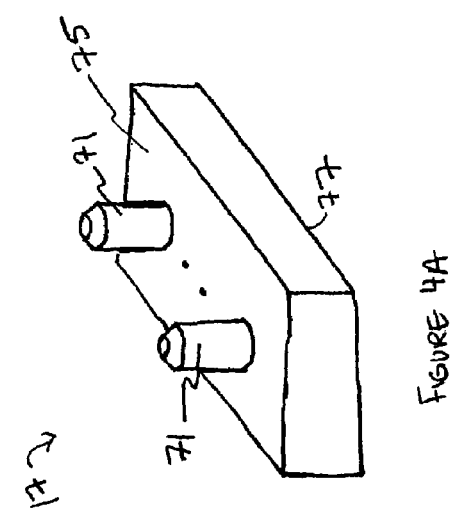
FIGURE 4A
FIGURE 4C

SMALL FOOTPRINT OPTICAL FIBER TRANSCEIVER

BACKGROUND OF THE INVENTION

Optical transceivers in fiber optic networking systems are generally mounted on network cards. It is desirable to minimize the dimensions of the optical transceiver so as to increase the number of transceivers that can fit on each network card, and to minimize the size of the network card itself. Proper heat dissipation is also a concern in the design of an optical transceiver as data transmission rates continue to increase. Current rates of transmission are around 10 gigabits per second.

In the prior art transceivers, the optical transmitter, receiver, and associated circuitry were separate integrated circuit (IC) components that were separately packaged and mounted on printed circuit boards (PCB). The ICs mounted on the PCB were subsequently attached to heat sinks by means of thermally conductive materials. The PCB and IC packages were relatively large, which increased the overall size and footprint of the optical transceiver. The large number of components also made manufacturing and assembly more time-consuming, difficult, and expensive. Furthermore, this was an expensive way to dissipate heat from the components because of the extra material costs, thermally conductive interposal material, and additional assembly steps.

Consequently, there remains a need for an optical transceiver with a smaller footprint and minimal components, having characteristics for improved heat dissipation.

SUMMARY OF THE INVENTION

In a preferred embodiment, an optical transceiver includes a main body that serves as the heat sink for the optical transceiver. A wafer-level package is attached to a first face of the main body. The wafer-level package contains at least one optoelectronic device such as a light-emitting device or a light detector. An alignment element is attached to the wafer-level package for aligning an optical fiber to the optoelectronic device. A fiber receptacle is attached to the main body for holding the optical fiber securely. One or more auxiliary components can be attached to a second face of the main body. An optional cover can be attached to the main body to cover and protect the auxiliary components. A flexible circuit is made of a pliable material and is attached to the main body. The flexible circuit electrically couples the auxiliary components and the wafer-level package. The flexible circuit also has contacts for connecting to circuitry external to the optical transceiver.

Further features and advantages of the present invention, as well as the structure and operation of preferred embodiments of the present invention, are described in detail below with reference to the accompanying exemplary drawings.

BRIEF DESCRIPTION OF THE DRAWINGS

FIGS. 3A and 3B show the wafer-level package in more detail.

FIGS. 4A–4D show the alignment element in further detail.

DETAILED DESCRIPTION

Figure 1A:
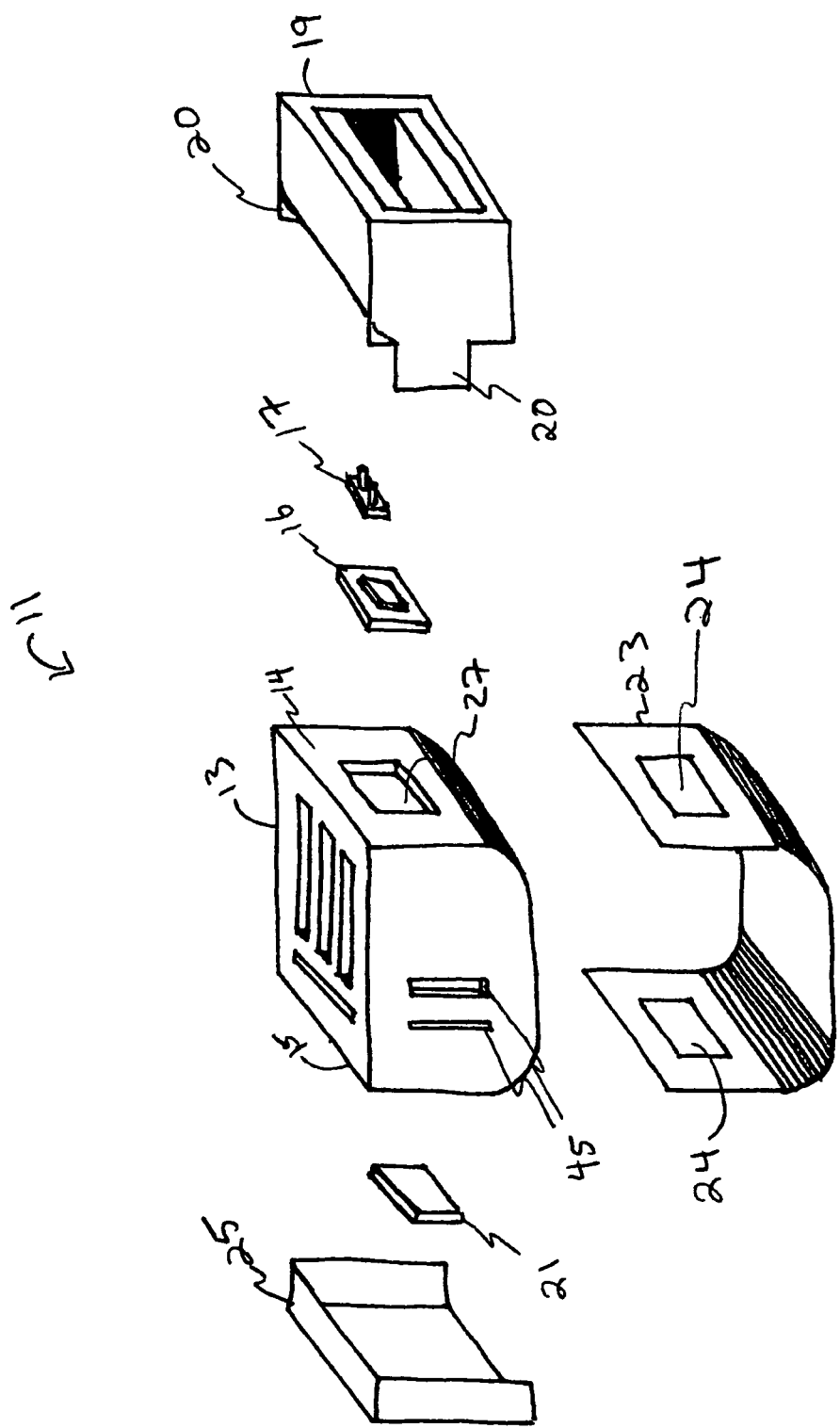
FIGS. 1A and 1B show a preferred embodiment of an optical transceiver.
Figure 1B:
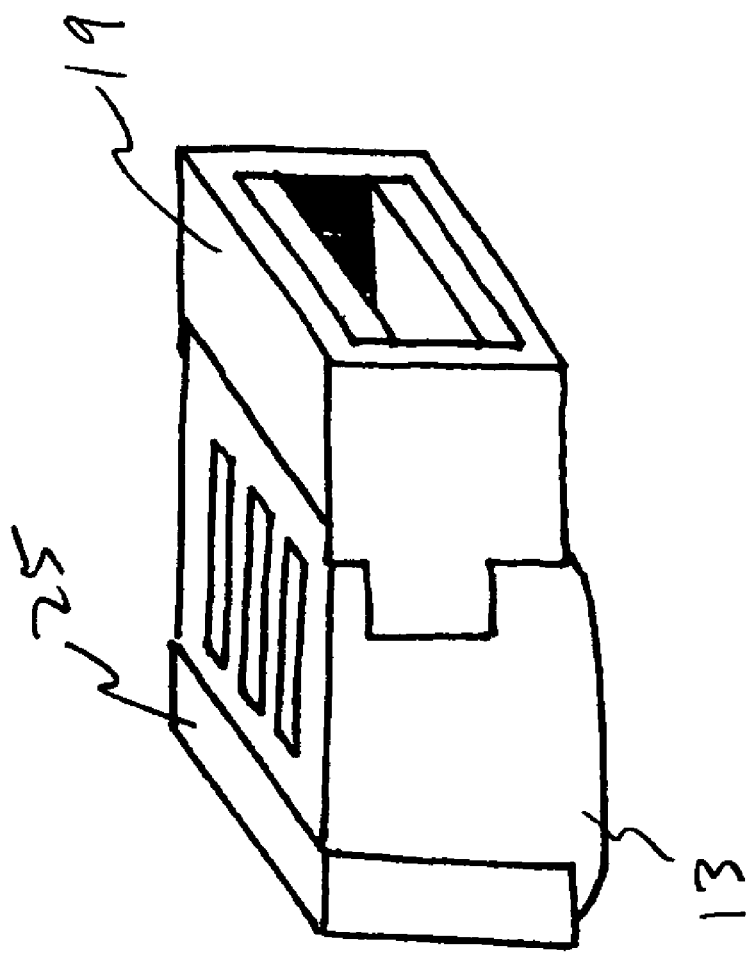

FIGS. 1A and 1B show a preferred embodiment of an optical transceiver, made in accordance with the teachings of the present invention. FIG. 1A shows an exploded view, while FIG. 1B shows the optical transceiver as it would appear when assembled. The optical transceiver 11 includes a main body 13 having a first face 14 and a second face 15. The main body 13 serves as the heat sink for the optical transceiver 11. A wafer-level package 16 is attached to the first face 14 of the main body 13. The wafer-level package 16 contains at least one optoelectronic device such as a light-emitting device or a light detector. An alignment element 17 is attached to the wafer-level package 16 for aligning an optical fiber (not shown) to the optoelectronic device. A fiber receptacle 19 is attached to the main body 13 for holding the optical fiber securely.

One or more auxiliary components 21 (such as microprocessors, resistors, capacitors, EEPROMs, ROMs, etc.) can be attached to the second face 15 of the main body 13. Only one auxiliary component 21 is shown in FIG. 1 for the sake of simplicity, but more components can be used. The auxiliary components 21 can be used to control the functionality of the wafer-level package 16 and the optoelectronic device contained within. An optional cover 25 can be attached to the main body 13 to cover and protect the auxiliary components 21. The optional cover 25 can be formed from a metal sheet or other material.

A flexible circuit 23 is attached to the main body using glue, adhesive, or other means of attachment. The flexible circuit 23 includes conductive traces (not shown) and contact sites (not shown) for connecting to external components. The flexible circuit 23 is made of a pliable material that conforms to the shape of the main body 13. The flexible circuit 23 has one or more cutout holes 24 that fit around the wafer level package 16 and auxiliary components 21. In one embodiment, the flexible circuit 23 is a solid piece without cutout holes 24, and the wafer level package 16 and the auxiliary components 21 rest upon the flexible circuit 23. Since the flexible circuit 23 conforms to the shape of the main body, it does not waste valuable space like the prior art stiff PC board.

The auxiliary components 21 and wafer-level package 16 are electrically connected to the contact sites on the flexible circuit 23 through wire-bonding, soldering, or other technique for making electrical connections. The conductive traces in the flexible circuit 23 electrically connect the auxiliary components 21 to the wafer-level package 16. The flexible circuit 23 also includes contact sites for connecting to components external to the optical transceiver 11.

Since the wafer-level package 16 and the auxiliary components 21 can be mounted directly to the main body 13, heat can be transferred between the components and the main body 13 more efficiently. Thus, the present invention has better heat dissipation than prior art optical transceivers.

The fiber receptacle 19 shown in FIG. 1 is designed to mate with a mini MT-RJ fiber optic connector. However, the fiber receptacle 19 is easily adaptable to mate with other types of fiber optic connectors, such as MPO, MT-RJ, FC, LC, SC, and ST type connectors. The fiber receptacle 19 has tabs 20 or other features that interlock with notches 45 on the main body 13 to hold the fiber receptacle 19 securely in place. The fiber receptacle 19 can be secured to the main body 13 using various other mechanisms. The fiber receptacle 19 can be formed from metal, which is helpful in reducing the electromagnetic interference (EMI) from the optical transceiver 11. Other non-metal materials, such as plastic, can also be used but will lack the EMI reducing capabilities of metal. The fiber receptacle 19 can be made by injection molding or other methods.

Figure 2A:
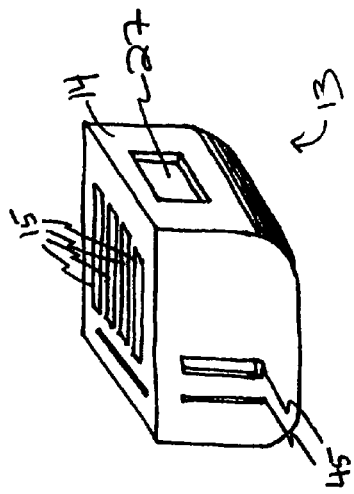
FIGS. 2A–2D show the main body from several different views.
Figure 2B:
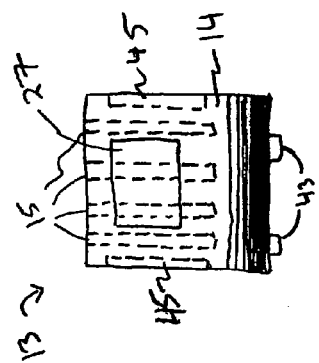
Figure 2C:
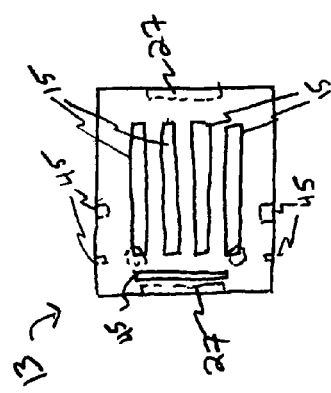
Figure 2D:
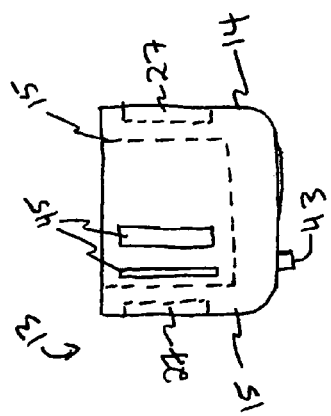

FIGS. 2A–2D show the main body 13 from several different views. FIG. 2A is a top view, FIG. 2B is a side perspective view, FIG. 2C is a side view, and FIG. 2D is a front view of the main body 13. The main body 13 is formed of metal or any other material having high thermal conductivity for dissipating heat. For example, in one embodiment the main body 13 is an injection molded aluminum part. The main body 13 can include features such as integrated heat sink fins 15. The integrated heat sink fins 15 are features, such as cavities or protrusions, which increase the exposed surface area of the main body 13 to facilitate the dissipation of heat. The main body 13 has stubs 43 that can be used to position the flexible circuit 23. The flexible circuit 23 can have corresponding holes that are designed to fit around the stubs 43 as the flexible circuit 23 is attached to the main body 13. These stubs 43 can also be used guide the optical transceiver 11 into place on a corresponding network card. The corresponding network card would have features that match with the stubs 43.

In one embodiment, the first face 14 of the main body 13 has an optional recessed cavity 27 in which the wafer-level package 16 is mounted. The second face 15 can also have an optional recessed cavity 27 in which the auxiliary components 21 are mounted. The main body 13 may also have notches 45 or other attachment features to secure the fiber receptacle 19 and the optional cover 25 to the main body 13.

FIGS. 3A and 3B show the wafer-level package 16 in more detail. FIG. 3A is an exploded view of the wafer-level package 16. The wafer-level package 16 includes a sub-mount 51, one or more optoelectronic devices 53, and a lid 55. The sub-mount 51 is a substrate made of silicon, gallium arsenide, or other similar material. The sub-mount 51 has contact sites 57 for mounting the optoelectronic devices 53. The sub-mount 51 is fabricated with integrated electrical traces and integrated circuitry (such as drivers or amplifiers) for the optoelectronic devices 53. Other circuitry such as resistors, etc. may also be fabricated in the sub-mount 51.

The optoelectronic devices 53 can be light-emitting devices (e.g. a Vertical Cavity Surface Emitting Laser (VCSEL), an edge-emitting diode, etc.), light detectors (e.g. a photodiode, phototransistor, etc.), or a combination of both. In the embodiment shown in FIG. 3A, the optoelectronic devices 53 include a VCSEL for transmitting optical data, a monitor photodiode monitoring the output of the VCSEL, and a PIN diode for receiving optical data. This embodiment would function as an optical transceiver. In one embodiment, the optoelectronic devices 53 consist of a light-emitting device and an optional monitor photodiode—this embodiment has the function of a transmitter. In one embodiment, the only optoelectronic device is a detector such as a PIN diode—this embodiment has the function of a receiver. There are various ways of connecting an optoelectronic device 53 to the sub-mount 51. For example, if one of the optoelectronic devices 53 is a back-emitting VCSEL or back-illuminated photodiode, it can be flip-chip mounted to the contact sites 57. Alternatively, an optoelectronic device 53 can simply be soldered into place onto the sub-mount 51 and then wire-bonded to contact pads (not shown) on the sub-mount 51.

A gasket 59 on the sub-mount 51 surrounds the contact sites 57. The gasket 59 can be a metal solder ring or other sealing material. The lid 55 is attached to the sub-mount 51 at the gasket 59, forming a hermetically sealed cavity for the optoelectronic devices 53. The lid material should be suitably transparent to the operative light wavelength of the optical transceiver 11. An optoelectronic device 53 can have an integrated lens formed over the active region (e.g. a light-emitting or a light-detecting area), wherein the lens rests on or is supported by a structure resting on the surface of the optoelectronic device 53 itself. A lens can also be formed as part of the lid 55, such as integrated lens 61, so that the lens is aligned with the active region of the optoelectronic device 53 once the lid 55 is attached to the sub-mount 51. FIG. 3B shows a rear view of the lid 55 with the integrated lens 61. The lid 55 may also have reflective surfaces built into it to deflect a portion of any transmitted light towards a monitoring device.

The wafer-level package 16 integrates the optoelectronic devices and drivers into one streamlined package, thus reducing the number of components. For more detailed information on wafer-level packages with integrated lenses and reflective surfaces, please see U.S. patent application Ser. No. 10/666,442 (Integrated Optics and Electronics), U.S. patent application Ser. No. 10/665,680 (Optical Device Package With Turning Mirror and Alignment Post), or U.S. patent application Ser. No. 10/666,363 (Wafer-Level Packaging of Optoelectronic devices). By using a wafer-level package and a flexible circuit, the size of the optical transceiver 11 can be reduced dramatically. Some preliminary calculations estimate that the optical transceiver 11 of the present invention may have a footprint that is one-third, or less, the size of the footprint of the prior art transceivers such as the Xenpak, X2, SFF and SFP transceivers.

FIGS. 4A–4D show the alignment element 17 in further detail. FIG. 4A is a perspective view, FIG. 4B is a back view, FIG. 4C is a side view, and FIG. 4D is a top view. The alignment element 17 is a single piece made from injection molding or other process that can produce a monolithic component. Prior art alignment elements were two or more separate pieces, each piece requiring separate attachment to the optoelectronic devices. The present invention provides a single alignment element 17, thus reducing the number of parts required to manufacture and assemble the optical transceiver 11.

The alignment element 17 is made from a material such as plastic, glass, or other material that is suitably transparent to the operative light wavelength of the optical transceiver 11. The alignment element 17 has a front face 75 and a back face 77. The back face 77 is attached to the lid 55 of the wafer-level package 16 using a suitable optically transparent adhesive, or other secure means. The front face 75 of the alignment element 17 can be sloped to minimize back reflections from the optical fiber.

The alignment element 17 has features that mate, interlock, or otherwise match with a fiber optic connector, to align the active region of an optoelectronic device 53 with an optical fiber. For example, in the embodiment shown in FIGS. 4A–4D, the alignment element 17 has two posts 71 that guide a fiber connector into alignment with the optoelectronic devices 53 in the wafer-level package 16. A mini MT-RJ connector has a ferrule with corresponding female features that can mate with the posts 71. The pathways for optical signals transmitted or received by the optoelectronic devices 53 pass between the posts 71, through the alignment element 17, to optical fibers within the ferrule. The posts 71 can be easily adapted to fit other types of fiber optic connectors as well. In one embodiment, the pathways for the optical signals pass through the posts 71 of the alignment element 17. Such an alignment element would be suitable for connecting with LC, ST, and SC type connectors.

Although the present invention has been described in detail with reference to particular preferred embodiments, persons possessing ordinary skill in the art to which this invention pertains will appreciate that various modifications and enhancements can be made without departing from the spirit and scope of the claims that follow.

I claim:

1. An optoelectronic module, comprising:
   a main body including material having high thermal conductivity for dissipating heat;
   a flexible circuit, a majority of the flexible circuit conforming to an exterior of the main body;
   a wafer-level package attached to the main body and electrically coupled to the flexible circuit, the wafer-level package including at least one optoelectronic device having an active region; and
   an alignment element attached to the wafer-level package, the alignment element having features shaped to match with an optical fiber connector and align the active region of the optoelectronic device to an optical fiber.

2. A module as in claim 1, further comprising:
   a fiber receptacle attached to the main body for coupling with an optical fiber connector.

3. A module as in claim 2, wherein the alignment element mates with a ferrule on the optical fiber connector.

4. A module as in claim 3, further comprising:
   an auxiliary component attached to the main body, the auxiliary component coupled to the wafer-level package through the flexible circuit.

5. A module as in claim 4, further comprising a cover over the auxiliary component and attached to the main body.

6. A module as in claim 2, wherein the fiber receptacle is a mini MT-RJ connector.

7. A module as in claim 2, wherein the fiber receptacle is of a type selected from the group consisting of MPO, MT-RJ, FC, LC, $SC_3$ and ST connectors.

8. A module as in claim 1, the wafer-level package including:
   a sub-mount having a first surface and a gasket formed on the first surface, wherein the optoelectronic device is attached to the first surface within the gasket; and
   a lid attached to the sub-mount at the gasket, forming an enclosure containing the optoelectronic device.

9. A module as in claim 8, wherein the sub-mount comprises a first wafer and the lid comprises a second wafer.

10. A module as in claim 9, the wafer-level package further including:
    a driver formed within the sub-mount for driving the optoelectronic device.

11. A module as in claim 9, the wafer-level package further including:
    an amplifier formed within the sub-mount for amplifying a signal from the optoelectronic device.

12. A module as in claim 9, wherein the optoelectrome device is a light-emitting device.

13. A module as in claim 9, wherein the optoelectronic device is a light detector.

14. A module as in claim 9, wherein the wafer-level package includes a light-emitting device and a light-detector.

15. A module as in claim 9, wherein the optoelectronic device has an active region, and
    the lid of the wafer-level package includes an integrated lens aligned with the active region of the optoelectronic device.

16. A module as in claim 9, further comprising a lens formed over the active region of the optoelectronic device.

17. A module as in claim 1, wherein the features of the alignment element are posts.

18. A module as in claim 17, wherein the alignment element has a sloped surface to reduce back reflections.

19. The module as in claim 1, wherein the exterior of the main body has a first face, an opposing second face, and a third face extending therebetween, and wherein the flexible circuit extends between the first face and the second face.

20. The module as in claim 9, further including:
    means for amplifying a signal from the optoelectronic device.

* * * * *

UNITED STATES PATENT AND TRADEMARK OFFICE
CERTIFICATE OF CORRECTION

PATENT NO. : 7,066,661 B2
APPLICATION NO. : 10/813938
DATED : June 27, 2006
INVENTOR(S) : Stefano Therisod It is certified that error appears in the above-identified patent and that said Letters Patent is hereby corrected as shown below:

Column 5, Line 36, Claim 7, delete "$SC_3$" and insert -- SC, --;

Column 6, Line 14, Claim 12, delete "optoelectrome" and insert -- optoelectronic --.

Signed and Sealed this

Eighth Day of June, 2010

David J. Kappos
*Director of the United States Patent and Trademark Office*